(12) United States Patent
Kim et al.

(10) Patent No.: US 9,966,633 B2
(45) Date of Patent: May 8, 2018

(54) ELECTROLYTE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Yun-Hee Kim, Yongin-si (KR); Ho-Seok Yang, Yongin-si (KR); Young Sam Park, Yongin-si (KR); Jin-Hyeok Lim, Yongin-si (KR); Hee-Yeon Hwang, Yongin-si (KR); Hyun-Woo Kim, Yongin-si (KR); Se-Jeong Park, Yongin-si (KR); Min-Young Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 263 days.

(21) Appl. No.: 14/685,495

(22) Filed: Apr. 13, 2015

(65) Prior Publication Data

US 2016/0006076 A1    Jan. 7, 2016

(30) Foreign Application Priority Data

Jul. 3, 2014    (KR) ........................ 10-2014-0083292

(51) Int. Cl.
*H01M 10/0567* (2010.01)
*H01M 10/0525* (2010.01)
*H01M 10/42* (2006.01)
*H01M 10/0569* (2010.01)

(52) U.S. Cl.
CPC ... *H01M 10/0567* (2013.01); *H01M 10/0525* (2013.01); *H01M 10/4235* (2013.01); *H01M 10/0569* (2013.01); *H01M 2300/004* (2013.01)

(58) Field of Classification Search
CPC ......... H01M 10/0567; H01M 10/0569; H01M 10/0525; H01M 10/4235; H01M 2300/004
See application file for complete search history.

(56) References Cited

U.S. PATENT DOCUMENTS 7,824,578 B2    11/2010    Lee et al.
8,815,454 B2    8/2014     Kim et al.

FOREIGN PATENT DOCUMENTS

| JP | 2012-204005 A | 10/2012 |
|---|---|---|
| JP | 2013-051198 A | 3/2013 |
| KR | 10-2007-0031807 A | 3/2007 |
| KR | 10-2009-0063441 A | 6/2009 |

*Primary Examiner* — Laura Weiner (74) *Attorney, Agent, or Firm* — Knobbe, Martens, Olson & Bear, LLP (57) ABSTRACT

Disclosed are an electrolyte for a rechargeable lithium battery including a lithium salt, organic solvent and an additive including a compound represented by the following Chemical Formula 1 and a rechargeable lithium battery including the same.

[Chemical Formula 1]

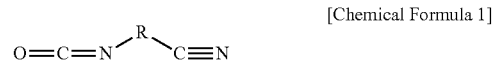

In the above Chemical Formula 1, R is the same as described in the detailed description.

17 Claims, 7 Drawing Sheets

ELECTROLYTE FOR RECHARGEABLE LITHIUM BATTERY AND RECHARGEABLE LITHIUM BATTERY INCLUDING SAME

CROSS-REFERENCE TO RELATED APPLICATIONS

This application claims priority to and the benefit of Korean Patent Application No. 10-2014-0083292 filed in the Korean Intellectual Property Office on Jul. 3, 2014, the entire contents of which are incorporated herein by reference.

BACKGROUND

Field

An electrolyte for a rechargeable lithium battery and a rechargeable lithium battery including the same are disclosed.

Description of the Related Art

A rechargeable lithium battery may be recharged and has three or more times higher energy density per unit weight than a conventional lead storage battery, nickel-cadmium battery, nickel hydrogen battery, nickel zinc battery and the like, and may be highly charged and thus, is commercially manufactured for a laptop, a cell phone, an electric tool, an electric bike, and the like, and researches on improvement of additional energy density have been actively made.

In general, a rechargeable lithium battery consists of a positive electrode, a negative electrode, a separator disposed between both of the electrodes, and an electrolyte, and a method of improving performance of the rechargeable lithium battery without having an influence on properties of the electrolyte by adding a functional additive in a small amount to the electrolyte has drawn attention.

As requirement of a rechargeable lithium battery having a high energy density, for example, a battery for an electric vehicle has been recently increased, a high voltage positive active material has been actively researched to improve an energy density through a high voltage, but an electrolyte additive for preventing oxidation of an electrolyte on the interface of an electrolyte with a positive active material is little researched.

SUMMARY

One embodiment provides an electrolyte for a rechargeable lithium battery having excellent cycle-life characteristics at a high voltage and capable of suppressing a thickness change at a high temperature.

Another embodiment provides a rechargeable lithium battery including the electrolyte for a rechargeable lithium battery.

One embodiment provides an electrolyte for a rechargeable lithium battery including a lithium salt; an organic solvent; and an additive including a compound represented by the following Chemical Formula 1.

[Chemical Formula 1]

In the above Chemical Formula 1,

R is a substituted or unsubstituted C1 to C10 alkylene group, a cyclohexylene group, a phenylene group, or a benzylene group.

In the above Chemical Formula 1, R may be the substituted or unsubstituted C1 to C10 alkylene group, and the alkylene group may be a substituted or unsubstituted C1 to C5 alkylene group.

The compound represented by the above Chemical Formula 1 may be in an amount of about 0.01 parts by weight to about 5 parts by weight, or about 0.1 parts by weight to about 3 parts by weight based on 100 parts by weight of the organic solvent.

The additive may further include fluoroethylene carbonate, vinylethylene carbonate, propane sultone, propene sultone, succinonitrile, adiponitrile, vinylene carbonate, succinic anhydride, hexane tricarbonitrile, or a combination thereof.

The organic solvent may include a carbonate-based compound, an ester-based compound, an ether-based compound, a ketone-based compound, an alcohol-based compound, or a combination thereof.

Another embodiment provides a rechargeable lithium battery including a positive electrode; a negative electrode; and the electrolyte.

The rechargeable lithium battery may be operated at a voltage of greater than or equal to about 4.35V.

Other embodiments are included in the following detailed description.

A rechargeable lithium battery having excellent cycle-life characteristics at a high voltage and suppressed from a thickness change at a high temperature may be realized.

DETAILED DESCRIPTION

Hereinafter, embodiments are described in detail. However, these embodiments are examples, and this disclosure is not limited thereto.

As used herein, when a definition is not otherwise provided, the term 'substituted' refers to one substituted with a substituent selected from a halogen (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof, instead of hydrogen of a compound.

An electrolyte for a rechargeable lithium battery according to one embodiment includes a lithium salt, an organic solvent, and an additive.

In general, when an electrolyte has a wider potential window than a potential difference between positive and negative active materials, a reaction on the surface of the active materials with an electrolyte may be suppressed. However, when an active material for a high voltage is used to increase energy density of a battery, the potential window of the electrolyte becomes narrower than the potential difference of the active material. Accordingly, a protection film for preventing the electrolyte from directly contacting with the electrode active material may be formed to suppress decomposition of the electrolyte and maintain capacity during long cycles.

Herein, succinonitrile, adiponitrile, glutaronitrile and the like can be used as an electrolyte additive for protecting a positive electrode. These materials realize excellent thermal properties and high temperature performance and improve a voltage drop during a formation process. In addition, the materials increase ion conductivity and polarity and cut off gas generation or a fine short circuit route, since a metal-ligand bond through a strong bond between a nitrile group in the materials with a transition metal such as cobalt on the surface of the positive electrode suppresses various side-reactions on the interface thereof. However, the materials have excellent effects of protecting the surface of a positive active material but do not form a protection film on the surface of a negative active material and thus, do not suppress a side reaction of the negative active material with an electrolyte. Accordingly, an electrolyte additive such as vinylene carbonate may be separately added to control reactivity the electrolyte with a negative electrode and thus, realize cell performance.

The electrolyte additive such as vinylene carbonate may lower reactivity of the negative electrode with the electrolyte and suppress a side-reaction of the electrolyte with the negative electrode but has a problem of rather generating gas at the positive electrode due to low oxidation resistance, when a battery is operated at a high temperature and at a high voltage for a long time.

In one embodiment, a compound represented by the following Chemical Formula 1 as an additive may be used.

[Chemical Formula 1]

In the above Chemical Formula 1,

R is a substituted or unsubstituted C1 to C10 alkylene group, a cyclohexylene group, a phenylene group, or a benzylene group.

The compound represented by the above Chemical Formula 1 has a structure that a functional group such as an isocyanate group and a nitrile group exists in one molecule.

The isocyanate group helps formation of a SEI film on the surface of a negative electrode, while the nitrile group may have a strong bond with a transition metal in a positive active material and thus, suppress a side-reaction of an electrolyte with the positive active material and cut off generation of gas and resultantly, protect the positive electrode. In this way, when a compound having two functional groups in one molecule is used as an additive for an electrolyte, excellent cycle-life characteristics may be obtained at a high voltage, and a thickness change may be suppressed by suppressing a side reaction of the electrolyte with an electrode active material at a high temperature and thus, decreasing a gas generation amount.

In the above Chemical Formula 1, R may be the substituted or unsubstituted C1 to C10 alkylene group. In the above Chemical Formula 1, when the R is a C1 to C10 alkylene group, the additive may not only be easily synthesized but also its steric hindrance is not high and thus, protects both positive and negative electrodes, realizing excellent cycle-life characteristics at a high voltage and suppressing a thickness change at a high temperature. R may be a C1 to C7 alkylene group, or a C1 to C5 alkylene group.

The compound represented by the above Chemical Formula 1 may be included in an amount of about 0.01 parts by weight to about 5 parts by weight, about 0.02 parts by weight to about 4 parts by weight, about 0.1 parts by weight to about 3 parts by weight, or about 0.1 parts by weight to about 2.5 parts by weight based on 100 parts by weight of the organic solvent. When the compound is used within the range, the compound may suppress conductivity decrease of lithium ions on the interface of the positive and negative electrodes and prevent excessive formation of a SEI film on the surface of a negative active material and thus, increase of interface resistance and deterioration of initial capacity and rate capability.

The additive may be used with fluoroethylene carbonate, vinylethylene carbonate, propane sultone, propene sultone, succinonitrile, adiponitrile, vinylene carbonate, succinic anhydride, hexane tricarbonitrile, or a combination thereof.

When these additives are used together, the additive may be included in an amount of about 0.5 parts by weight to about 30 parts by weight, or about 1 part by weight to about 20 parts by weight based on 100 parts by weight of the organic solvent. When the additives are used within the range, cycle-life characteristics at a high voltage may be more excellent, and a thickness change at a high temperature may be further suppressed. Furthermore, the mixing weight ratio of the compound and the additives may be about 1:0.5 to 1:100.

The lithium salt is dissolved in an organic solvent, supplies lithium ions in a battery, operates a basic operation of the rechargeable lithium battery, and improves lithium ion transportation between positive and negative electrodes therein.

The lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers, and e.g., an integer of 1 to 20), LiCl, LiI, $LiB(C_2O_4)_2$ (lithium bisoxalatoborate (LiBOB)), or a combination thereof.

The lithium salt may be used in a concentration of about 0.1 M to about 2.0 M. When the lithium salt is included at the above concentration range, an electrolyte may have excellent performance and lithium ion mobility due to optimal electrolyte conductivity and viscosity.

The organic solvent serves as a medium for transmitting ions taking part in the electrochemical reaction of a battery.

The organic solvent may include a carbonate-based compound, an ester-based compound, an ether-based compound, a ketone-based compound, an alcohol-based compound, or a combination thereof.

The carbonate-based compound may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Particularly, when linear carbonate compound and cyclic carbonate compound are mixed with each other, a solvent having a high dielectric constant and a low viscosity may be provided. The cyclic carbonate compound and linear carbonate compound may be mixed together in a volume ratio ranging from about 1:1 to about 1:9.

The ester-based compound may include methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based compound may include dibutylether, tetraglyme, diglyme, dimethoxyethane, 2-methyltetrahydrofuran, tetrahydrofuran, and the like, and the ketone-based compound may include cyclohexanone, and the like. The alcohol-based compound may be ethanol, isopropyl alcohol, and the like.

The organic solvent may be used singularly or in a mixture. When the organic solvent is used in a mixture, the mixture ratio may be controlled in accordance with a desirable battery performance.

Hereinafter, a rechargeable lithium battery including the electrolyte is illustrated referring to FIG. 1.

Figure 1:
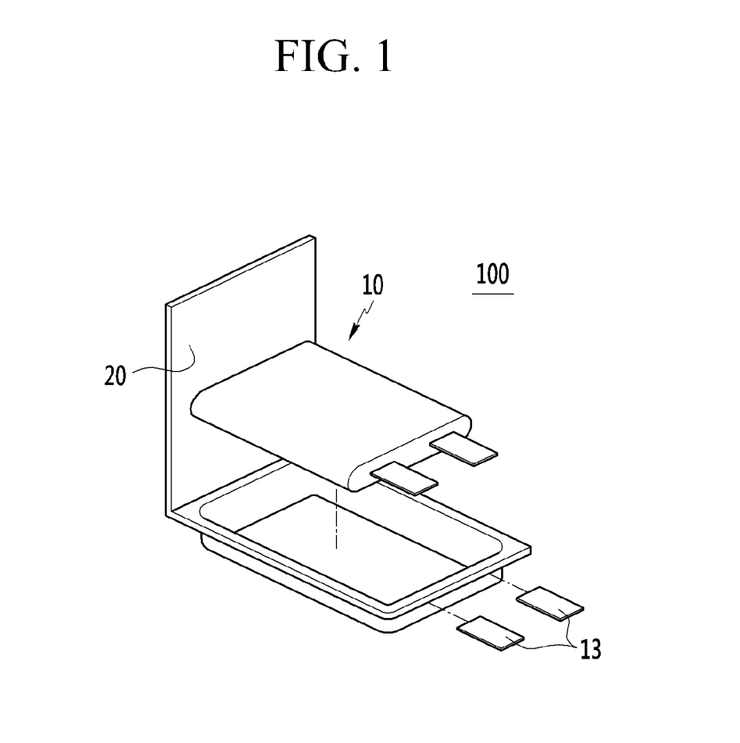
FIG. 1 is a schematic view showing a rechargeable lithium battery according to one embodiment.

FIG. 1 is a schematic view showing a rechargeable lithium battery according to one embodiment.

Referring to FIG. 1, a rechargeable lithium battery 100 according to one embodiment includes an electrode assembly 10, a battery case 20 including the electrode assembly 10, and an electrode tab 13 that play a role of an electricity path for externally drawing current generated in the electrode assembly 10. The battery case 20 was sealed by overlapping two sides facing each other. In addition, an electrolyte is injected into the battery case 20 containing the electrode assembly 10.

The electrode assembly 10 includes a positive electrode, a negative electrode facing the positive electrode, and a separator interposed between the positive electrode and the negative electrode, and the above electrolyte is impregnated in the positive electrode, the negative electrode, and the separator.

The positive electrode includes a positive current collector and a positive active material layer formed on the positive current collector. The positive active material layer includes a positive active material, a binder, and optionally a conductive material.

The positive current collector may be Al (aluminum), but is not limited thereto.

The positive active material may include lithiated intercalation compounds that reversibly intercalate and deintercalate lithium ions. At least one composite oxide of lithium and a metal of cobalt, manganese, nickel, or a combination thereof may be used, and specific examples thereof may be a compound represented by one of the following Chemical Formulae:

$Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, 0≤c≤0.05); $Li_aE_{2-b}B_bO_{4-c}D_c$ (0.90≤a≤1.8, 0≤b≤0.5, 0≤c≤0.05); $Li_aNi_{1-b-c}Co_bB_cD_\alpha$ (0.90≤a≤1.8, 0≤b≤0.5, 0≤c≤0.05, 0≤α≤2); $Li_aNi_{1-b-c}Co_bB_cO_{2-\alpha}F_\alpha$ (0.90≤a≤1.8, 0≤b≤0.5, 0≤c≤0.05, 0≤α≤2); $Li_aNi_{1-b-c}Co_bB_cO_{2-\alpha}F_2$ (0.90≤a≤1.8, 0≤b≤0.5, 0≤c≤0.05, 0≤α≤2); $Li_aNi_{1-b-c}Mn_bB_cD_\alpha$ (0.90≤a≤1.8, 0≤b≤0.5, 0≤c≤0.05, 0≤α≤2); $Li_aNi_{1-b-c}Mn_bB_cO_{2-\alpha}F_\alpha$ (0.90≤a≤1.8, 0≤b≤0.5, 0≤c≤0.05, 0≤α≤2); $Li_aNi_{1-b-c}Mn_bB_cO_{2-\alpha}F_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The positive active material may be lithium cobalt oxide, lithium nickel cobalt manganese oxide, lithium nickel cobalt aluminum oxide, or a combination thereof.

The binder improves binding properties of the positive active material particles to each other and to a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples of the conductive material include one or more of natural graphite, artificial graphite, carbon black, acetylene black, ketjen black, a carbon fiber, a metal powder or a metal fiber of copper, nickel, aluminum, silver, and the like, a polyphenylene derivative, and the like.

The negative electrode includes a negative current collector and a negative active material layer formed on the negative current collector.

The negative current collector may be a copper foil, a nickel foil, a stainless steel foil, a titanium foil, a nickel foam, a copper foam, a polymer substrate coated with a conductive metal, or a combination thereof, but is not limited thereto.

The negative active material layer includes a negative active material, a binder, and optionally a conductive material.

The negative active material may be a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes carbon materials. The carbon material may be any generally-used carbon-based negative active material in a lithium ion secondary battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium include Si, SiOx (0<x<2), a Si—C composite, a Si—Y alloy (wherein Y is an alkali metal, an alkaline-earth metal, Group 13 to 16 elements, a transition element, a rare earth element, or a combination thereof, and not Si), Sn, $SnO_2$, a Sn—C composite, Sn—Y (wherein Y is an alkali metal, an alkaline-earth metal, Group 13 to 16 elements, a transition element, a rare earth element, or a combination thereof, not Sn), and the like. At least one of them may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, and the like.

The binder improves binding properties of the negative active material particles to each other and to a current collector. The binder may include a non-water-soluble binder, a water-soluble binder, or a combination thereof.

Nonlimiting examples of the non-water-soluble binder include polyvinylchloride, carboxylated polyvinylchloride, polyvinyl fluoride, ethylene oxide-containing polymers, polyvinylpyrrolidone, polyurethane, polytetrafluoroethylene, polyvinylidene fluoride, polyethylene, polypropylene, polyamideimide, polyimide, and combinations thereof.

Nonlimiting examples of the water-soluble binder include styrene-butadiene rubbers, acrylated styrene-butadiene rubbers, polyvinyl alcohol, sodium polyacrylate, copolymers of propylene and a C2 to C8 olefin, copolymers of (meth)acrylic acid and (meth)acrylic acid alkyl ester, and combinations thereof.

When a water-soluble binder is used as the negative electrode binder, a cellulose-based compound may also be included to provide viscosity. The cellulose-based compound may include one or more of carboxymethyl cellulose, hydroxypropylmethyl cellulose, methyl cellulose, and alkali metal salts thereof. The alkali metal may be Na, K, or Li. The cellulose-based compound may be included in an amount of about 0.1 to about 3 parts by weight based on 100 parts by weight of the negative active material.

Examples of the binder may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of a negative electrode. Any electrically conductive material can be used as a conductive agent unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene; or a mixture thereof.

The negative electrode and positive electrode may be manufactured in a method of preparing an active material composition by mixing each active material, a conductive material, and a binder and coating the composition on a current collector. The solvent includes N-methylpyrrolidone and the like, but is not limited thereto.

The separator may include any materials commonly used in the conventional lithium battery as long as separating a negative electrode from a positive electrode and providing a transporting passage for lithium ions. The separator may be made of a material having a low resistance to ion transportation and an improved impregnation for an electrolyte. For example, the material may be selected from glass fiber, polyester, TEFLON (tetrafluoroethylene), polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. It may have a mono-layered or multi-layered structure.

A rechargeable lithium battery including the above electrolyte may not only secure excellent cycle-life characteristics at a high voltage, at a voltage of greater than or equal to about 4.35 V but may also be suppressed from a thickness change at a high temperature.

Hereinafter, the embodiments are illustrated in more detail with reference to examples. However, the following are example embodiments and are not limiting.

Furthermore, what is not described in this disclosure may be sufficiently understood by those who have knowledge in this field and will not be illustrated here.

Example 1

$LiCoO_2$, polyvinylidene fluoride and carbon black in a weight ratio of 97.5:1.5:1 were added to N-methylpyrrolidone (NMP) as a solvent to prepare slurry. The slurry was coated on an aluminum (Al) thin film and then, dried and compressed, manufacturing a positive electrode.

97 wt % of an active material obtained by mixing artificial graphite (3HE, Shanshan Technology) and natural graphite (H3P, Shanshan Technology) in a weight ratio of 8:2, a styrene-butadiene rubber and carboxylmethyl cellulose in a weight ratio of 97:1.5:1.5 were added to a pure water solvent to prepare slurry. The slurry was coated on a copper foil and then, dried and compressed, manufacturing a negative electrode.

An electrolyte solution was prepared by mixing ethylene carbonate, ethylmethyl carbonate and diethyl carbonate in a volume ratio of 3:5:2 to obtain an organic solvent, adding 1.15 M $LiPF_6$ thereto, and then, adding 1 part by weight of the compound represented by Chemical Formula 2 based on 100 parts by weight of the organic solvent.

The positive and negative electrodes and the electrolyte solution were used along with a polyethylene separator to manufacture a pouch-type rechargeable lithium battery cell.

[Chemical Formula 2]

Example 2

A pouch-type rechargeable lithium battery cell was manufactured according to the same method as Example 1 except for using 0.5 parts by weight of the compound represented by the above Chemical Formula 2 based on 100 parts by weight of the organic solvent to prepare the electrolyte solution in Example 1.

Example 3

A pouch-type rechargeable lithium battery cell was manufactured according to the same method as Example 1 except for using 0.25 parts by weight of the compound represented by the above Chemical Formula 2 based on 100 parts by weight of the organic solvent to prepare the electrolyte solution in Example 1.

Example 4

A pouch-type rechargeable lithium battery cell was manufactured according to the same method as Example 1 except for using 2 parts by weight of the compound represented by the above Chemical Formula 2 based on 100 parts by weight of the organic solvent to prepare the electrolyte solution in Example 1.

Example 5

A pouch-type rechargeable lithium battery cell was manufactured according to the same method as Example 1 except for using 0.25 parts by weight of the compound represented by the above Chemical Formula 3 based on 100 parts by weight of the organic solvent to prepare the electrolyte solution in Example 1.

[Chemical Formula 3]

Comparative Example 1

A pouch-type rechargeable lithium battery cell was manufactured according to the same method as Example 1 except for not using the compound represented by the above Chemical Formula 2 to prepare the electrolyte solution in Example 1.

Comparative Example 2

A pouch-type rechargeable lithium battery cell was manufactured according to the same method as Example 1 except for using 2 parts by weight of vinylene carbonate instead of the compound represented by the above Chemical Formula 2 based on 100 parts by weight of the organic solvent to prepare the electrolyte solution in Example 1.

Example 6

A prismatic rechargeable lithium battery cell was manufactured according to the same method as Example 1 except for using 0.5 parts by weight of the compound represented by the above Chemical Formula 2 based on 100 parts by weight of the organic solvent to prepare the electrolyte solution in Example 1.

Example 7

A prismatic rechargeable lithium battery cell was manufactured according to the same method as Example 1 except for using 0.25 parts by weight of the compound represented by the above Chemical Formula 2 based on 100 parts by weight of the organic solvent to prepare the electrolyte solution in Example 1.

Comparative Example 3

A prismatic rechargeable lithium battery cell was manufactured according to the same method as Example 1 except for not using the compound represented by the above Chemical Formula 2 to prepare the electrolyte solution in Example 1.

Evaluation 1: Cyclic Voltammetry (CV) Analysis of Electrolyte Solution

Figure 2:
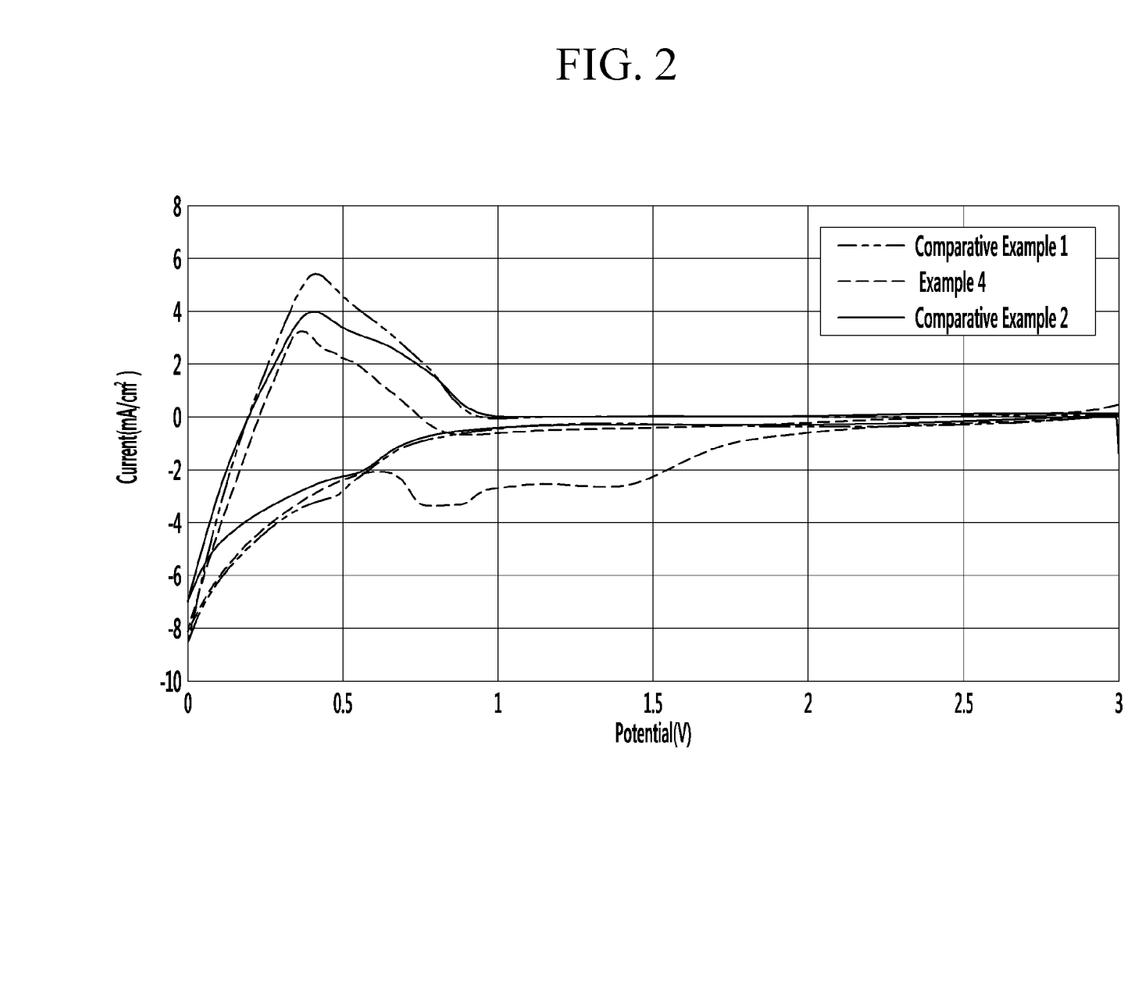
FIG. 2 is a graph showing cyclic voltammetry (CV) of the electrolyte solutions according to Example 4 and Comparative Examples 1 and 2.

FIG. 2 shows cyclic voltammetry (CV) graphs of the electrolyte solutions according to Example 4 and Comparative Examples 1 and 2.

Reduction reactivity of the electrolyte additives used in Example 4 and Comparative Examples 1 and 2 was evaluated by using cyclic voltammetry (CV), and the results are provided in FIG. 2. The measurement was performed by using a three electrode electrochemical cell including a graphite negative electrode as a working electrode and Li metals as a standard electrode and a counter electrode. Herein, scanning was three cycles performed from 3 V to 0 V and from 0 V to 3 V at a speed of 1.0 mV/sec.

Referring to FIG. 2, Example 4 including the compound represented by Chemical Formula 2 showed a current due to reduction decomposition from 1.5 V and a secondary reduction decomposition peak in a region of 0.7 V. Accordingly, a protection film turned out to be formed on the graphite over a wide voltage region before decomposition of the solvent during the charge that lithium ions are inserted into the graphite.

Evaluation 2: Linear Sweep Voltammetry (LSV) Analysis of Electrolyte Solution FIG. 3 shows linear sweep voltammetry (LSV) graphs of the electrolyte solutions according to Example 4 and Comparative Examples 1 and 2.

Figure 3:
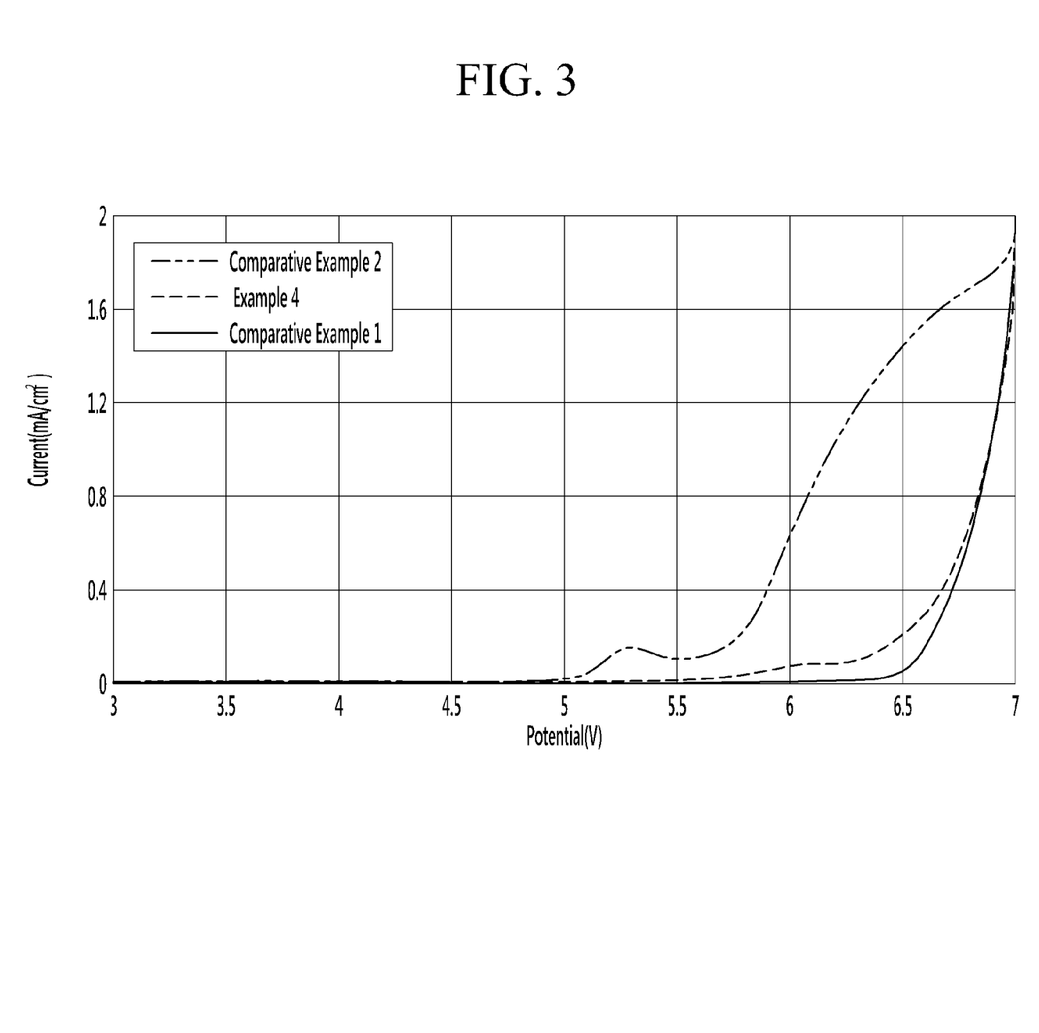
FIG. 3 is a graph showing linear sweep voltammetry (LSV) of the electrolyte solutions according to Example 4 and Comparative Examples 1 and 2.

Anodic polarization of the electrolyte solutions according to Example 4 and Comparative Examples 1 and 2 was evaluated by using linear sweep voltammetry (LSV) to evaluate their oxidation electrode decomposition, and the results are provided in FIG. 3. The measurement was performed by using a three electrode electrochemical cell including a Pt disk (an inner diameter of 1.6 mm) as a working electrode and Li metals as a standard electrode and a counter electrode. Herein, scanning was performed from 3 V to 7 V at a speed of 1.0 mV/sec.

Referring to FIG. 3, Comparative Example 2 including vinylene carbonate was oxidized and decomposed at a lower voltage than Comparative Example 1 not including the additive, which started to be decomposed from 5.0 V. On the other hand, Example 4 including the compound represented by Chemical Formula 2 was oxidized and decomposed from 5.5 V, which was higher than Comparative Example 2.

Accordingly, the additive having an isocyanate group and a nitrile group according to one embodiment showed excellent oxidation resistance compared with the vinylene carbonate. Therefore, a thickness change may be expected to be minimized, since gas was less generated at the positive electrode when allowed to stand at a high temperature.

Evaluation 3: Impedance Analysis of Rechargeable Lithium Battery Cell

Figure 4:
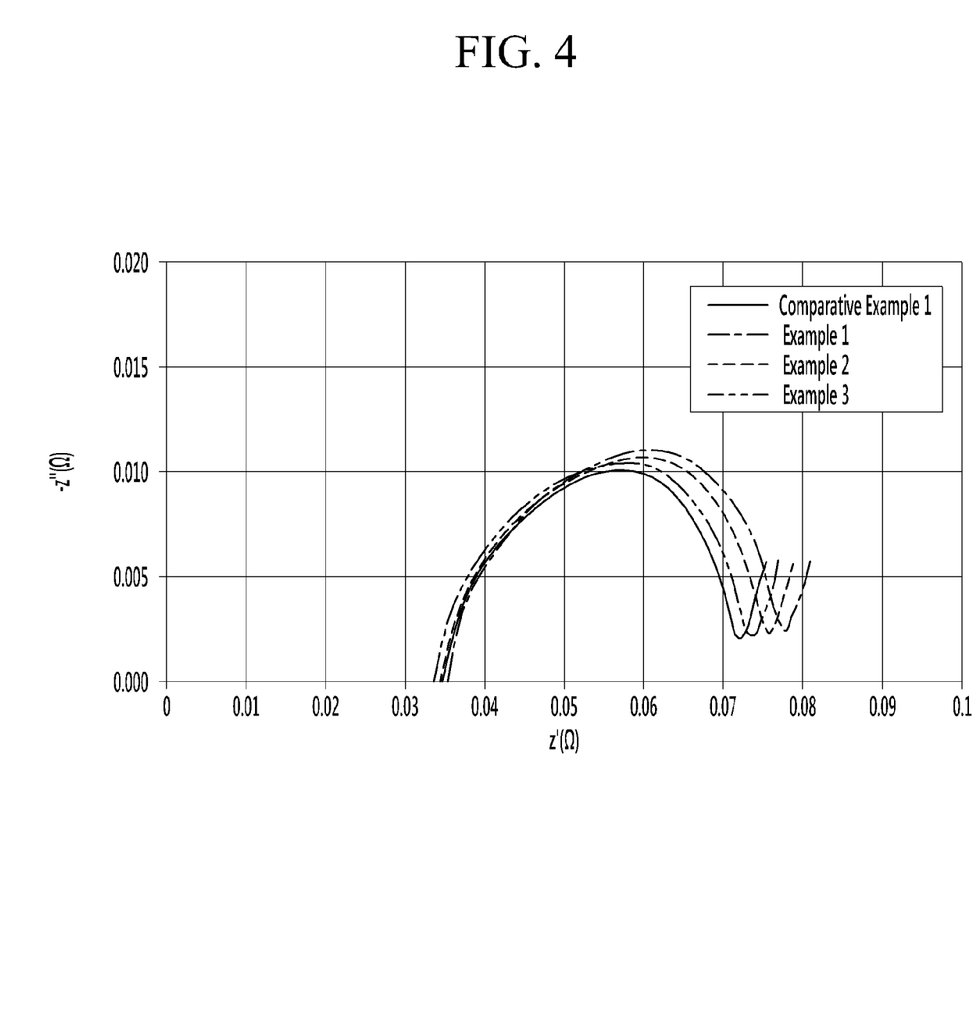
FIG. 4 is a graph showing AC impedance of the pouch-type rechargeable lithium battery cells according to Examples 1 to 3 and Comparative Example 1.

FIG. 4 shows AC impedance graphs of the pouch-type rechargeable lithium battery cells according to Examples 1 to 3 and Comparative Example 1.

The AC (alternating current) impedance was measured under a cut-off full-charge condition at 0.5 C and 4.40 V for 3 hours after formation.

Referring to a nyquist plot in FIG. 4, Examples 1 to 3 including the compound represented by Chemical Formula 2 showed larger initial interface resistance than Comparative Example 1 not including the additive. In particular, as the compound represented by Chemical Formula 2 was more added, interface resistance was increased. The reason is that the additive according to one embodiment well formed a film on the surface of the negative electrode as shown in the CV.

Evaluation 4: High Voltage Cycle-Life Characteristics and High Temperature Thickness Change of Rechargeable Lithium Battery Cell High voltage cycle-life characteristics and high temperature thickness of the pouch-type rechargeable lithium battery cells according to Examples 1 to 5 and Comparative Examples 1 and 2 and the prismatic rechargeable lithium battery cells according to Examples 6 and 7 and Comparative Example 3 were evaluated, and the results are respectively provided in the following Tables 1 and 2 and FIGS. 5 to 7.

The high voltage cycle-life characteristics were evaluated by measuring capacity change under the following charge and discharge condition for 400 cycles. In the following Tables 1 and 2, capacity retention (%) was obtained as a percentage of discharge capacity at the 400th cycle relative to discharge capacity at the initial cycle.

Charge: CC/CV 0.5 C 4.40 V, 0.03 C cut-off
Discharge: CC 0.5 C 3.0 V cut-off

The high temperature thickness change was measured after the cells were allowed to stand at 60° C. for 30 days in a full charge state. In the following Tables 1 and 2, a thickness variation ratio (%) is [(thickness after allowed to stand at 60° C. for 30 days−initial thickness)/initial thickness]×100.

TABLE 1

| | Additive | Amount of additive (part by weight) | Initial discharge capacity (mAh) | Initial thickness (mm) | Thickness after allowed to stand at 60° C. for 30 days (mm) | Thickness variation ratio (%) | Capacity retention (%) |
|---|---|---|---|---|---|---|---|
| Example 1 | Compound of Chemical Formula 2 | 1 | 2765 | 4.36 | 4.87 | 12 | 83 |
| Example 2 | Compound of Chemical Formula 2 | 0.5 | 2800 | 4.35 | 4.98 | 14 | 85 |
| Example 3 | Compound of Chemical Formula 2 | 0.25 | 2830 | 4.35 | 5.02 | 15 | 89 |
| Example 4 | Compound of Chemical Formula 2 | 2 | 2680 | 4.36 | 4.78 | 10 | 81 |
| Example 5 | Compound of Chemical Formula 3 | 0.25 | 2825 | 4.35 | 5.21 | 20 | 88 |
| Comparative Example 1 | — | — | 2820 | 4.36 | 5.43 | 25 | 70 |
| Comparative Example 2 | vinylene carbonate | 2 | 2780 | 4.36 | 6.10 | 40 | 80 |

TABLE 2

| | Additive | Amount of additive (parts by weight) | Initial discharge capacity (mAh) | Initial thickness (mm) | Thickness after allowed to stand at 60° C. for two weeks (mm) | Thickness variation ratio (%) |
|---|---|---|---|---|---|---|
| Example 6 | Compound of Chemical Formula 3 | 0.5 | 2745 | 5.03 | 5.87 | 17 |
| Example 7 | Compound of Chemical Formula 3 | 0.25 | 2763 | 5.01 | 5.68 | 13 |

TABLE 2-continued

| Additive | Amount of additive (parts by weight) | Initial discharge capacity (mAh) | Initial thickness (mm) | Thickness after allowed to stand at 60° C. for two weeks (mm) | Thickness variation ratio (%) |
|---|---|---|---|---|---|
| Comparative Example 3 | — | 2765 | 5.08 | 6.04 | 19 |

Figure 5:
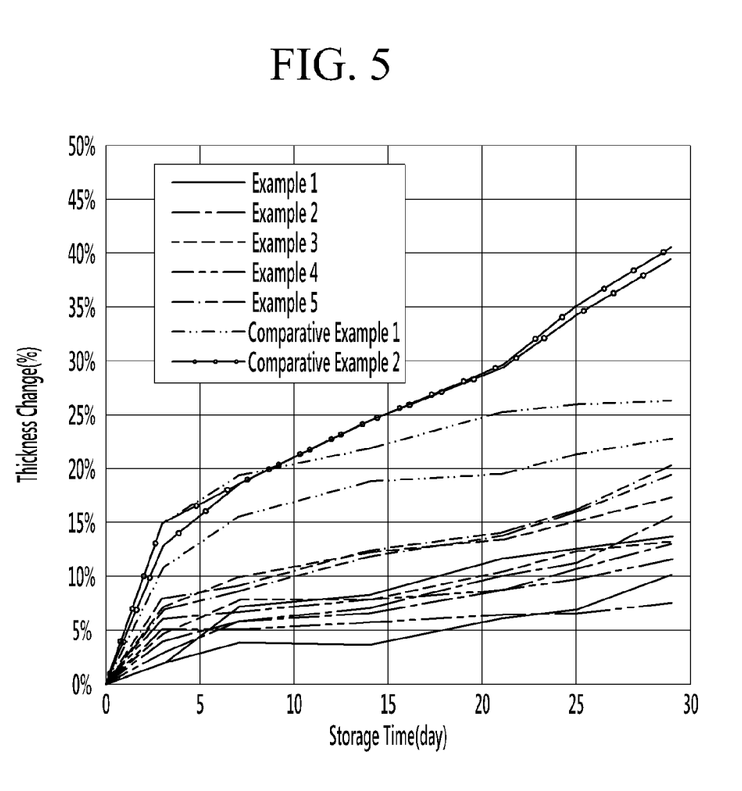
FIG. 5 is a graph showing thickness variation ratio of the pouch-type rechargeable lithium battery cells according to Examples 1 to 5 and Comparative Examples 1 and 2 when allowed to stand at a high temperature.

FIG. 5 is a graph showing thickness variation ratio of the pouch-type rechargeable lithium battery cells according to Examples 1 to 5 and Comparative Examples 1 and 2 when allowed to stand at a high temperature.

Figure 6:
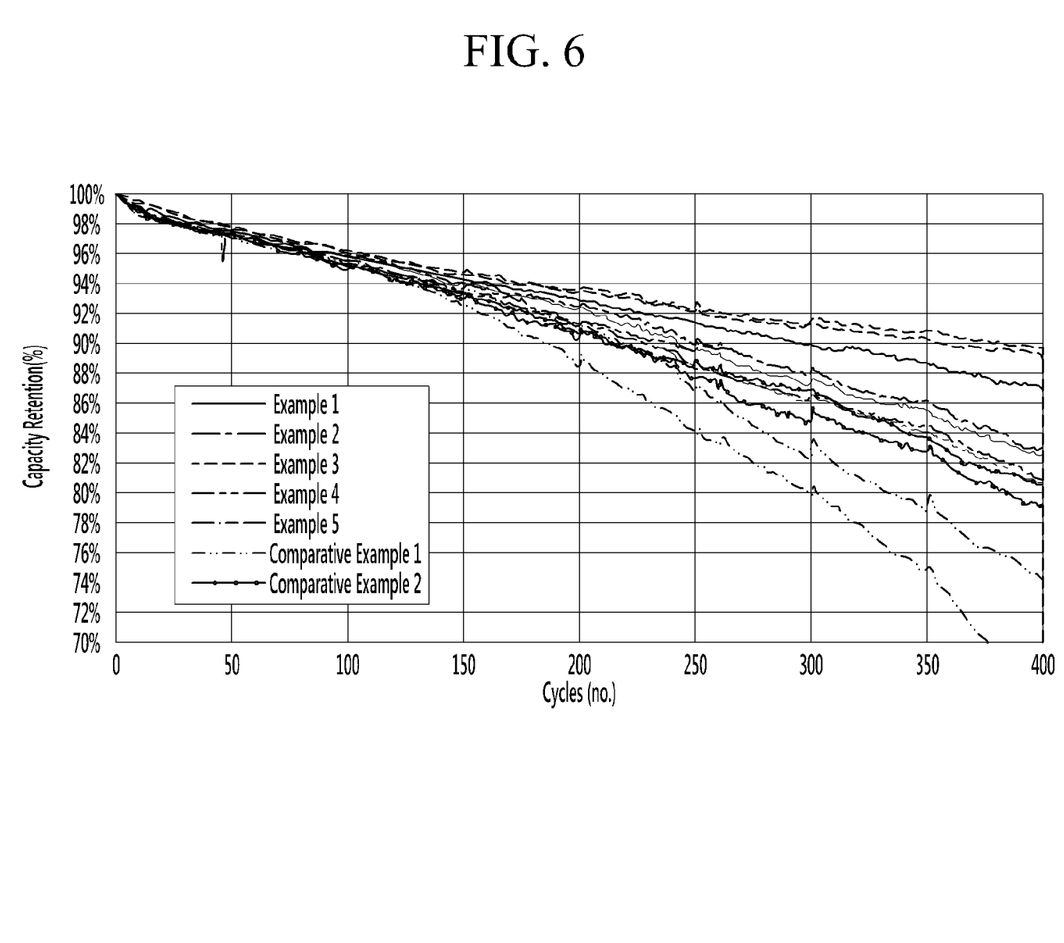
FIG. 6 is a graph showing room temperature cycle-life characteristics of the pouch-type rechargeable lithium battery cells according to Examples 1 to 5 and Comparative Examples 1 and 2.

FIG. 6 is a graph showing room temperature cycle-life characteristics of the pouch-type rechargeable lithium battery cells according to Examples 1 to 5 and Comparative Examples 1 and 2.

Figure 7:
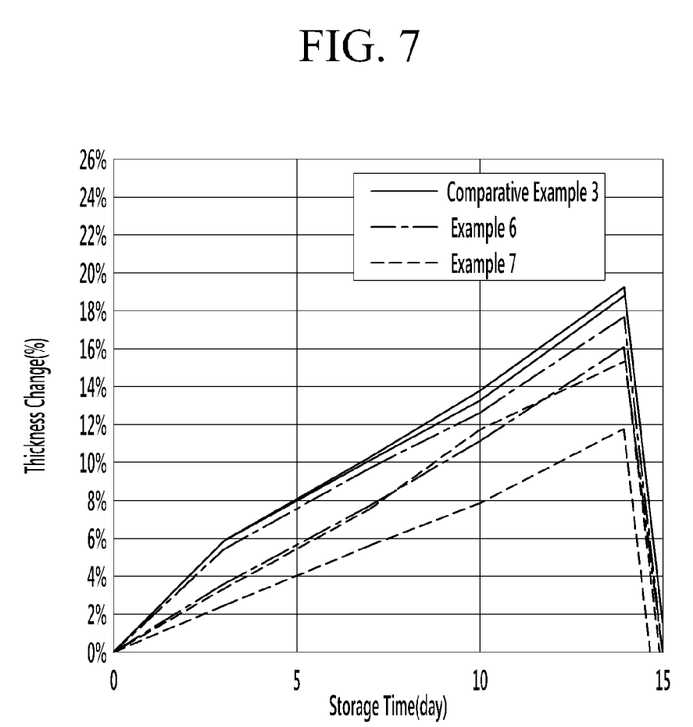
FIG. 7 is a graph showing thickness variation ratio of the prismatic rechargeable lithium battery cells according to Examples 6 and 7 and Comparative Example 3 when allowed to stand at a high temperature

FIG. 7 is a graph showing thickness variation ratio of the prismatic rechargeable lithium battery cells according to Examples 6 and 7 and Comparative Example 3 when allowed to stand at a high temperature.

Referring to Table 1 and FIGS. 5 and 6, Examples 1 to 5 using the additive according to one embodiment showed a small thickness change and excellent cycle-life characteristics at a high voltage when allowed to stand at a high temperature compared with Comparative Example 1 not using the additive and Comparative Example 2 using other additive.

In addition, referring to Table 2 and FIG. 7, Examples 6 and 7 using the additive of one embodiment showed a small thickness change at a high voltage when allowed to stand at a high temperature compared with Comparative Example 3 not using the additive.

While this disclosure has been described in connection with what is presently considered to be practical example embodiments, it is to be understood that the present embodiments are not limited to the disclosed embodiments, but, on the contrary, are intended to cover various modifications and equivalent arrangements included within the spirit and scope of the appended claims.

What is claimed is:

1. An electrolyte for a rechargeable lithium battery, comprising
   a lithium salt;
   an organic solvent; and
   an additive including a compound represented by the following Chemical Formula 1:

[Chemical Formula 1]

wherein,
   R is a $C_1$ to $C_{10}$ alkylene group, a cyclohexylene group, a phenylene group, or a benzylene group;
   wherein R is optionally substituted with at least one of selected from F, Br, Cl I, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group,
   and a combination thereof
   wherein Chemical Formula 1 is included in an amount of about 0.01 parts by weight to about 5 parts by weight based on 100 parts by weight of the organic solvent.

2. The electrolyte for a rechargeable lithium battery of claim 1, wherein R is the $C_1$ to $C_{10}$ alkylene group.

3. The electrolyte for a rechargeable lithium battery of claim 2, wherein the alkylene group is a $C_1$ to $C_5$ alkylene group.

4. The electrolyte for a rechargeable lithium battery of claim 2, wherein the alkylene group is a $C_1$ to $C_3$ alkylene group.

5. The electrolyte for a rechargeable lithium battery of claim 1, wherein the additive includes a compound represented by the following Chemical Formula:

6. The electrolyte for a rechargeable lithium battery of claim 1, wherein the additive includes a compound represented by the following Chemical 7. The electrolyte for a rechargeable lithium battery of claim 1, wherein the compound represented by the above Chemical Formula 1 is included in an amount of about 0.1 parts by weight to about 3 parts by weight based on 100 parts by weight of the organic solvent.

8. The electrolyte for a rechargeable lithium battery of claim 1, wherein the additive further comprises fluoroethylene carbonate, vinylethylene carbonate, propane sultone, propene sultone, succinonitrile, adiponitrile, vinylene carbonate, succinic anhydride, hexanetricarbonitrile, or a combination thereof.

9. The electrolyte for a rechargeable lithium battery of claim 1, wherein the organic solvent comprises a carbonate-based compound, an ester-based compound, an ether-based compound, a ketone-based compound, an alcohol-based compound, or a combination thereof.

10. A rechargeable lithium battery, comprising
    a positive electrode;
    a negative electrode; and
    an electrolyte comprising:

a lithium salt;
an organic solvent; and
an additive including a compound represented by the following Chemical Formula 1:

[Chemical Formula 1]

wherein,

R is a $C_1$ to $C_{10}$ alkylene group, a cyclohexylene group, a phenylene group, or a benzylene group;

wherein R is optionally substituted with at least one of selected from F, Br, Cl I, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof;

wherein Chemical Formula 1 is included in an amount of about 0.01 parts by weight to about 5 parts by weight based on 100 parts by weight of the organic solvent.

11. The rechargeable lithium battery of claim 10, wherein R is the $C_1$ to $C_{10}$ alkylene group.

12. The rechargeable lithium battery of claim 11, wherein the alkylene group is a $C_1$ to $C_5$ alkylene group.

13. The rechargeable lithium battery of claim 10, wherein the compound represented by the above Chemical Formula 1 is included in an amount of about 0.1 parts by weight to about 3 parts by weight based on 100 parts by weight of the organic solvent.

14. The rechargeable lithium battery of claim 10, wherein the additive further comprises fluoroethylene carbonate, vinylethylene carbonate, propane sultone, propene sultone, succinonitrile, adiponitrile, vinylene carbonate, succinic anhydride, hexanetricarbonitrile, or a combination thereof.

15. The rechargeable lithium battery of claim 10, wherein the organic solvent comprises a carbonate-based compound, an ester-based compound, an ether-based compound, a ketone-based compound, an alcohol-based compound, or a combination thereof.

16. The rechargeable lithium battery of claim 10, wherein the additive includes a compound represented by the following Chemical Formula:

17. The rechargeable lithium battery of claim 10, wherein the additive includes a compound represented by the following Chemical Formula

* * * * *